US007139928B1

(12) United States Patent
Bhattacharya et al.

(10) Patent No.: US 7,139,928 B1
(45) Date of Patent: Nov. 21, 2006

(54) METHOD AND SYSTEM FOR PROVIDING REDUNDANCY WITHIN A NETWORK ELEMENT (75) Inventors: Dipankar Bhattacharya, Saratoga, CA (US); Michael Roy Smith, San Jose, CA (US); Kevin Morishige, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 693 days.

(21) Appl. No.: 10/273,022

(22) Filed: Oct. 17, 2002

(51) Int. Cl.
*G06F 11/00* (2006.01)
(52) U.S. Cl. .......................................... 714/4; 370/217
(58) Field of Classification Search .................... 714/4; 370/227, 217–220
See application file for complete search history.

(56) References Cited

U.S. PATENT DOCUMENTS

| 4,700,340 | A | * | 10/1987 | Beranek et al. | ............. | 370/218 |
| 5,105,420 | A | * | 4/1992 | Ardon et al. | ................ | 370/216 |
| 5,610,913 | A | * | 3/1997 | Tomonaga et al. | .......... | 370/219 |
| 5,854,786 | A | * | 12/1998 | Henderson et al. | ......... | 370/335 |
| 6,894,970 | B1 | * | 5/2005 | McDermott et al. | ........ | 370/220 |
| 6,894,971 | B1 | * | 5/2005 | Watanabe | .................... | 370/228 |
| 6,922,791 | B1 | * | 7/2005 | Mashayekhi et al. | .......... | 714/4 |
| 2002/0078395 | A1 | * | 6/2002 | Wachel | ........................... | 714/4 |
| 2002/0097672 | A1 | * | 7/2002 | Barbas et al. | ................ | 370/216 |

FOREIGN PATENT DOCUMENTS

| EP | 1 202 504 A2 | 5/2002 | .................... | 12/56 |
| EP | 1 202 599 A2 | 5/2002 | .................... | 12/56 |
| WO | WO 99/11031 | 8/1998 | | |
| WO | WO 2004/062820 A2 | * | 7/2004 | |

OTHER PUBLICATIONS

Erwin P. Rathgeb, Wolfgang Fischer, Christian Hinterberger, Eugen Wallmeier, and Regina Wille-Fier; "The MainStreet*Xpress* Core Services Node—A Versatile ATM Switch Architecture for the Full Service Network;" pp. 795-806; IEEE Journal on Selected Areas in Communications, vol. 15, No. 5, Jun. 1997.
Copy of International Search Report as mailed from the PCT on Apr. 2, 2004 for counterpart WO Appl. (PCT/US03/32824; Filed Oct. 17, 2003), 5 pages).

* cited by examiner

*Primary Examiner*—Robert Beausoliel
*Assistant Examiner*—Michael Maskulinski
(74) *Attorney, Agent, or Firm*—Campbell Stephenson Ascolese LLP; Samuel G. Campbell, III (57) ABSTRACT

A network element is disclosed that provides redundancy within the network element that, in turn, provides fault tolerance for the failure of one or more processing units therein. In one embodiment, a network element according to the present invention includes N interface units, M processing units and a number of links. The value of N is an integer greater than 1. Each interface unit is coupled to L+1 processing units. The value of L is an integer greater than 0 and less than N, and the value of M equals N plus L. Each of the links is configured to couple one of the interface units and one of the processing units. Each of the interface units is configured to select one of the links that couples the interface unit and ones of the processing units, and the links include a primary link and a standby link.

51 Claims, 6 Drawing Sheets

METHOD AND SYSTEM FOR PROVIDING REDUNDANCY WITHIN A NETWORK ELEMENT

BACKGROUND OF THE INVENTION

1. Field of the Invention

The present invention relates to data communications, and, more particularly, to a method and apparatus for improved reliability in a network element.

2. Description of the Related Art

As more and more information is transferred over today's networks, businesses have come to rely heavily on their network infrastructure in providing their customers with timely service and information. Failures in such network infrastructures can be costly both in terms of lost revenue and idled employees. Thus, high reliability systems are becoming increasingly attractive to users of networking equipment.

For example, a common component in such networking environments is a switch, which directs network traffic between its ports. In an Ethernet network employing an OSI protocol stack, such a network element operates on Layer 2, the Data Link Layer. This layer handles transferring data packets onto and off of the physical layer, error detection and correction, and retransmission. Layer 2 is generally broken into two sub-layers: The LLC (Logical Link Control) on the upper half, which performs error checking, and the MAC (Medium Access Control) on the lower half, which handles transferring data packets onto and off of the physical layer. The ability to provide improved reliability in such a network element is important because such elements are quite common in networks. Providing the desired reliability, while not an insurmountable task, is made more difficult by the need to keep the cost of such network elements as low as possible. Thus, several approaches may be attempted.

For example, consider a switch in which a set of ports are connected to a switching matrix through a network processor or forwarding engine (FE). Assuming that the FE has an unacceptably-high failure rate (i.e., a low Mean Time Between Failures, or MTBF) and recovery time to meet the availability target for the switch. Several approaches can be used to address this problem.

The first such approach is to employ dual redundancy for all systems in the switch (port cards, route processor, FEs and so on). Thus, for each of the switch's ports, there is both a main FE and a backup FE. This provides a backup FE for each port, in case the port's main FE fails. Switchover to a backup FE is accomplished quickly, as the backup FE's configuration can be made to mirror that of the main FE. However, such an arrangement doubles the number of FEs in a given switch, doubling the cost of this solution when compared to a switch having a one-to-one ratio of FEs to ports. Thus, the high availability requirement nearly doubles the cost of the switch.

Another approach is to use a high-MTBF optical cross-connect (OXC) at the switch's input. Using this arrangement, in case of failure of an FE, the OXC redirects traffic from a port attached to the failed FE to another port (attached to an operational FE). This simplifies the internal structure and operation of the switch, offloading the transfer of data streams from failed FEs to operational FEs. Unfortunately, a high-MTBF OXC is required to provide the desired reliability, and, because such an OXC is expensive, unacceptably increases the cost of this approach.

A third approach is to employ dual redundant FEs. As in most switches, FEs are coupled to a switching matrix, to which the FEs couple data streams from their respective ports. However, in an arrangement such as this, two FEs (an FE pair) are coupled between one set of physical ports (referred to as a PPset) and one matrix port. Each FE in such a configuration is capable of servicing the FE pair's respective PPset. At any time only one FE need be active. In case of the failure of one FE, the other FE is called into service to process traffic. The two FEs are coupled through a small amount of electronics to the PPset and switch matrix. Thus, as with the first solution, the configuration of alternate FEs (which, in fact, could be either FE of an FE pair) is made to mirror that of the active FE, allowing fast switchover.

However, this solution entails some limitations. First, the electronics coupling the FEs to their respective ports and the switch matrix either is not redundant, or incurs the extra cost that attends such redundancy. Moreover, even if this circuitry is designed to have a high MTBF, increased cost is the likely result. Moreover, the additional FE for each PPset doubles the cost in comparison to having a single FE associated with each PPset. Thus, the costs for such a switch will also be significantly increased when compared to a non-redundant architecture.

Lastly, a switch can be configured with one or more backup FEs using a central mux/demux. This allows 1:N redundancy in the typical fashion, in which the port card connected to the failed forwarding engine is redirected directly to a backup forwarding engine. Such a central mux/demux is inserted between the switches ports and FEs. In this scenario, the FEs are connected to M switch matrix ports and to N PPsets through a N:M mux/demux, where M is greater than N and the number of backup FEs is M–N. At any time only N FEs need to be active to service all the PPsets in the system. Thus, when all FEs are in working order, there is a total of M–N backup FEs in the system. If any FE in the system fails, the system is reconfigured so that one of the backup FEs takes over for the failed FE by having the affected port card directly coupled to the backup FE. Such an approach is very efficient because the only switch over performed is coupling the affected port card(s) to the backup FEs.

Unfortunately, such an alternative also encounters some obstacles. First, the addition of the central mux/demux once again adds significantly to the cost of a switch designed in this manner. Moreover, the addition of the central mux/demux involves adding additional circuitry to the switch that may itself fail, thereby degrading reliability. If the central mux/demux is implemented using high MTBF circuitry (whether by redundancy or other method) to address this concern, the cost of such a switch will once again be increased.

As is apparent from the preceding discussion, while providing high availability is certainly possible, providing such reliability in a cost-effective manner is challenging. As with most engineering problems, a solution that is not commercially reasonable offers no real benefit to users (and so manufacturers). What is therefore needed is a way to provide for the reliable conveyance of data streams in an economically reasonable fashion.

SUMMARY OF THE INVENTION

In one embodiment of the present invention, a network element is disclosed. The network element includes N interface units and M processing units. The value of N is an integer greater than 1. Each interface unit is coupled to L processing units. The value of L is an integer greater than 0 and less than N, and the value of M equals N plus L.

In another embodiment of the present invention, a method of failure recovery in a network element is disclosed. The method includes selecting a first link, selecting a second link, and, upon a failure in a first processing unit, selecting a first standby link and a second standby link. The first link couples a first interface unit and the first processing unit. The second link couples a second interface unit and a second processing unit. The first standby link couples the first interface unit and the second processing unit, while the second standby link couples the second interface unit and a standby processing unit.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

The present invention provides for the reliable conveyance of data streams in an economically reasonable fashion by employing N+L (e.g., N+1) FEs using a distributed switching fabric (distributed fabric, or more simply, a fabric; where there are N port cards and M(=N+L)FEs). The FEs are coupled to the ports of a switching matrix, in a manner similar to that of a conventional switch, save for the additional input(s) required to support the additional FEs. However, the connection to the N sets of physical ports (again also referred to as PPsets) differs from conventional switches. In a switch according to an embodiment of the present invention, each FE and each PPset (referred to in the specific herein as a port card) includes a 2:1 mux/demux (or (L+1): 1 mux/demux, depending on the configuration, where L is the number of standby FEs for each port card). Through the 2:1 selector (e.g., a mux/demux), each PPset is connected to 2 FEs (or, as noted, to (L+1) FEs via an (L+1):1 mux/demux), one of which is referred to herein as a primary FE and the other of which is referred to herein as a standby FE. Only N FEs need to be active to service all N PPsets in the switch. These FEs are referred to herein as primary FEs. Thus, when all primary FEs are in working order, there is a total of one (or L) additional FE(s) available to support PPsets in the event of a primary FE failure. If any one FE in the system fails, the switch is reconfigured so that the additional FE(s) takes (take) over for the failed FE(s). These additional FEs and the primary FEs now supporting other port cards are referred to herein as standby FEs (the additional FEs can also be referred to separately as standby FEs). These techniques and structures can be implemented in switches, routers or other network elements to provide reliable, economical conveyance of data streams in a network environment.

The present invention offers a number of advantages. The cost of a switch employing an embodiment of the present invention is as comparable to or lower than the solutions described previously. Moreover, the connection between PPsets and FEs do not need to be routed through a central mux/demux, so there is less congestion in the connectivity infrastructure (e.g., in the midplane and/or backplane of the switch). Also, in comparison to an architecture that employs a central mux/demux, there is no need to design a high-MTBF central mux/demux, that can be expected to require its own redundancy. Such redundancy adds more connections in the midplane/backplane, as well as more complexity with regard to the management of that redundancy, and failover of the central mux/demux. Thus, by addressing the need for reliability, while maintaining costs at a relatively low level, the present invention meets the needs of users for reliable switching, in an economically reasonable fashion.

An Example Network Element Architecture

Figure 1:
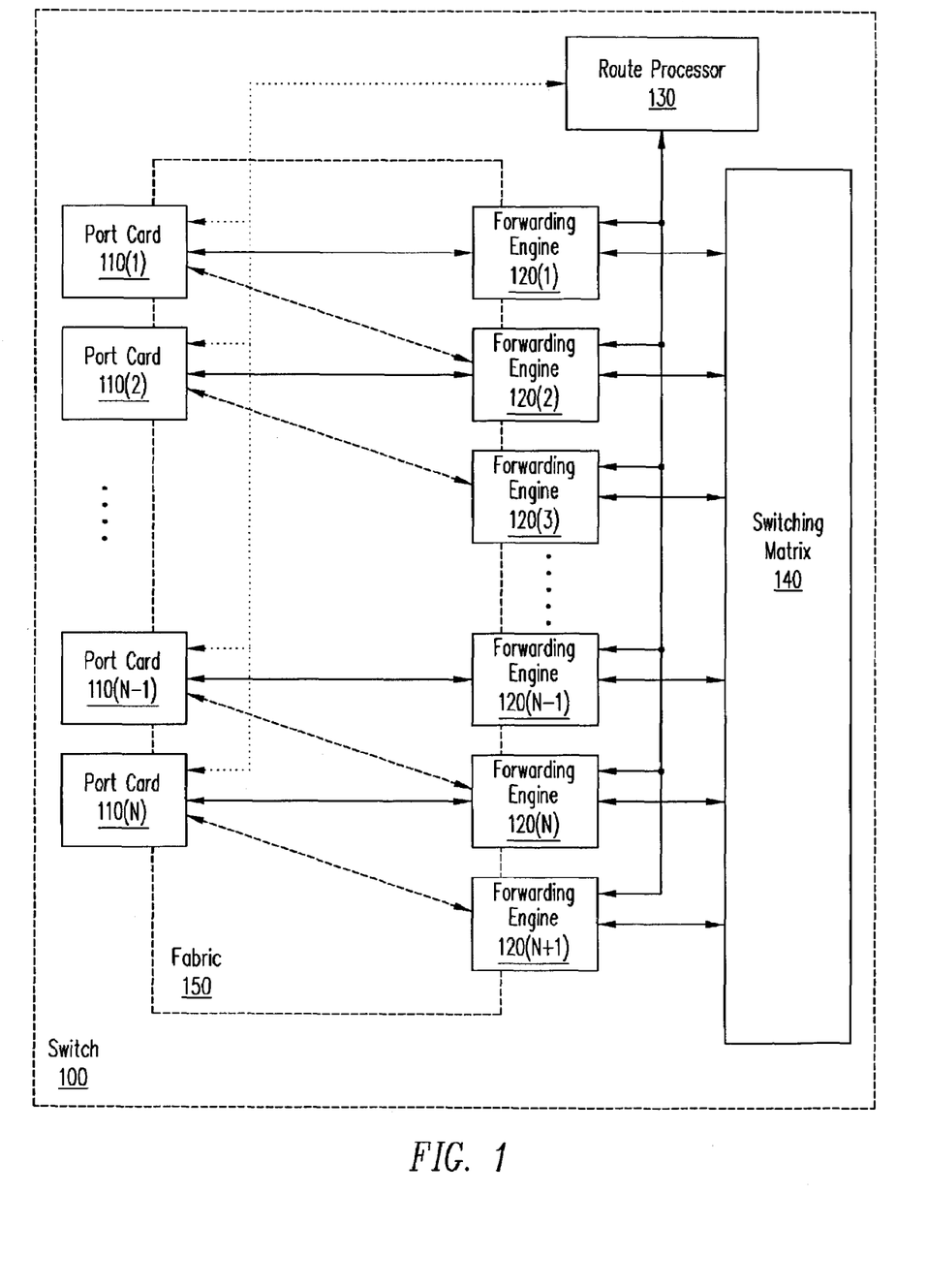
FIG. 1 is a block diagram illustrating a switch according to a forwarding engine redundancy scheme according to the present invention.

FIG. 1 is a block diagram illustrating a network element (in this case, a switch) that employs a redundancy scheme according to embodiments of the present invention. A switch 100 is illustrated in FIG. 1 as including a number of port cards (depicted as port cards 110(1)–(N)), a number forwarding engines (depicted as forwarding engines 120(1)–(N+1)), a route processor 130 and a switching matrix 140. It should be noted that, although not generally the case (as noted subsequently), the number of port cards (N) is related to the number of forwarding engines in this figure (N+1; or M(=N+L), in the more general case). Route processor 130 is coupled to control port cards 110(1)–(N) and forwarding engines 120(1)–(N+1). As is also depicted in FIG. 1, connections between port cards 110(1)–(N) and forwarding engines 120(1)–(N+1), as well as portions of these elements are taken in combination to represent a distributed switching fabric 150. Distributed switching fabric 150 represents a distributed multiplex/demultiplex arrangement that provides the connectivity necessary to support an N+1 forwarding engine redundancy scheme according to embodiments of the present invention.

In the event of a failure, described in greater detail subsequently with regard to FIGS. 4A and 4B, route processor 130 will typically take the actions necessary to react to failures in forwarding engines 120(1)–(N+1). This is because a failed forwarding engine may not be capable of accomplishing switchover, and the other forwarding engines may have no way to become aware of such a failure. This factor also highlights the benefit of each FE being able to switch over to its standby mode on its own, without requiring the transfer of information from another FE (which may have failed and be unable to provide such information).

The architecture of switch 100 can be generalized to one in which there are N port cards and M FEs. In this scenario, there are N primary FEs and L (where L=M−N) standby FEs. The interconnection of port cards to FEs can be accomplished in a number of ways, as is subsequently described in connection with the examples depicted in FIGS. 5 and 6. In this general scenario, each port card is coupled to a primary FE and a number (L) of standby FEs. The limit on L is N, for all practical purposes. This boundary case provides both a primary and standby FE for each port card, and so the arrangement devolves into an architecture similar to that of an architecture that employs a main FE and a backup FE for each port, with its attendant limitations.

Each port card is thus coupled to its corresponding L+1 FEs by a primary link and L standby links. As used here, a link is typically a transmission medium of some sort (e.g., a fiber optic cable, a coaxial cable or the like), and while this may include various types of signal processing (amplification, regeneration, bandwidth shaping or the like), such a transmission medium does not include any switching of data streams from any one source (e.g., port card or FE) to any one destination (e.g., FE or port card, respectively). As will be apparent to one of skill in the art, as the number L grows, so to does the number of standby links and FEs in the switch, with an attendant increase in complexity and cost. However, the increase in MTBF (and so reliability) provided by having multiple standby FEs may offset this increased complexity and cost to some extent, although this offset will likely tend to decrease rapidly as L is increased, making a large L relatively uneconomical (and in the boundary case, leading to the cost limitations previously noted). Using this architecture, one (or more) failed FE(s) is taken out of service, and the affected port cards (and those towards the standby FEs) shifted an appropriate number of FEs (equal to the number of failed FEs). Thus, if one FE fails, each port card connected to an FE between the failed FE and standby FE switches over (shifts) by one FE. (However, the number of FEs/port cards that need to switch is equal to the number of FEs between the failed FE and the standby FE.)

In addition to being able to handle multiple simultaneous FE failures, such an architecture is able to handle multiple temporally sequential FE failures. So, after a first FE fails and the affected port cards are switched over, another failure results in the switchover of the newly-switched over port cards. In this manner, a switch employing this architecture is able to continue operating in the face of multiple FE failures. The trade-off is, of course, increased complexity and cost, but this may be warranted in a given application having significantly higher MTBF requirements.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of switch 100). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

An important feature of a switch architected according to the present invention (e.g., switch 100) is the distributed switching fabric (e.g., distributed switching fabric 150). In comparison to other alternatives, a distributed switching fabric provides a simpler, more effective and more elegant solution to the interconnection needs of the port cards and FEs. This simplicity translates into better reliability (higher MTBF) and lower cost, and so addresses the needs of users better than other alternatives. This is especially true of the N+1 technique, which reduces the distributed switching fabric to a 2 input mux/demux on each port card and FE. This type of architecture is described in greater detail with regard to FIGS. 2A and 2B.

Figure 2A:
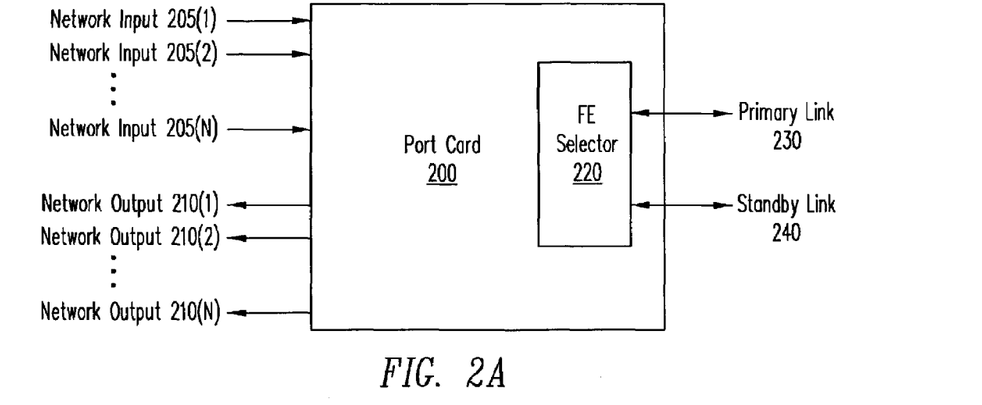
FIG. 2A is a block diagram illustrating a port card according to embodiments of the present invention.

FIG. 2A is a block diagram of a port card 200. Port card 200 is representative of one of port cards 110(1)–(N) of FIG. 1. Port card 200, as its name implies, supports a number of inbound and outbound ports that provide connectivity to the network elements whose data streams are to be switched. These connections are depicted in FIG. 2A as network inputs 205(1)–(N) and network outputs 210(1)–(N). Port card 200 also includes a forwarding engine selector (depicted as forwarding engine (FE) selector 220). FE selector 220 is coupled to both a primary forwarding engine (not shown)

and a standby FE (also not shown). In the normal circumstance, selector 220 couples port card 200 to its primary forwarding engine via primary link 230. If the primary forwarding engine fails, selector 220 couples port card 200 to its standby forwarding engine via a standby link 240. Connections to primary forwarding engines are shown in FIG. 1 by solid lines between ones of port cards 110(1)–(N) and forwarding engines 120(1)–(N). Similarly, connections between a port card and its standby forwarding engine is shown in FIG. 1 by dashed lines between ones of port cards 110(1)–(N) and forwarding engines 120(1)–(N+1).

Figure 2B:
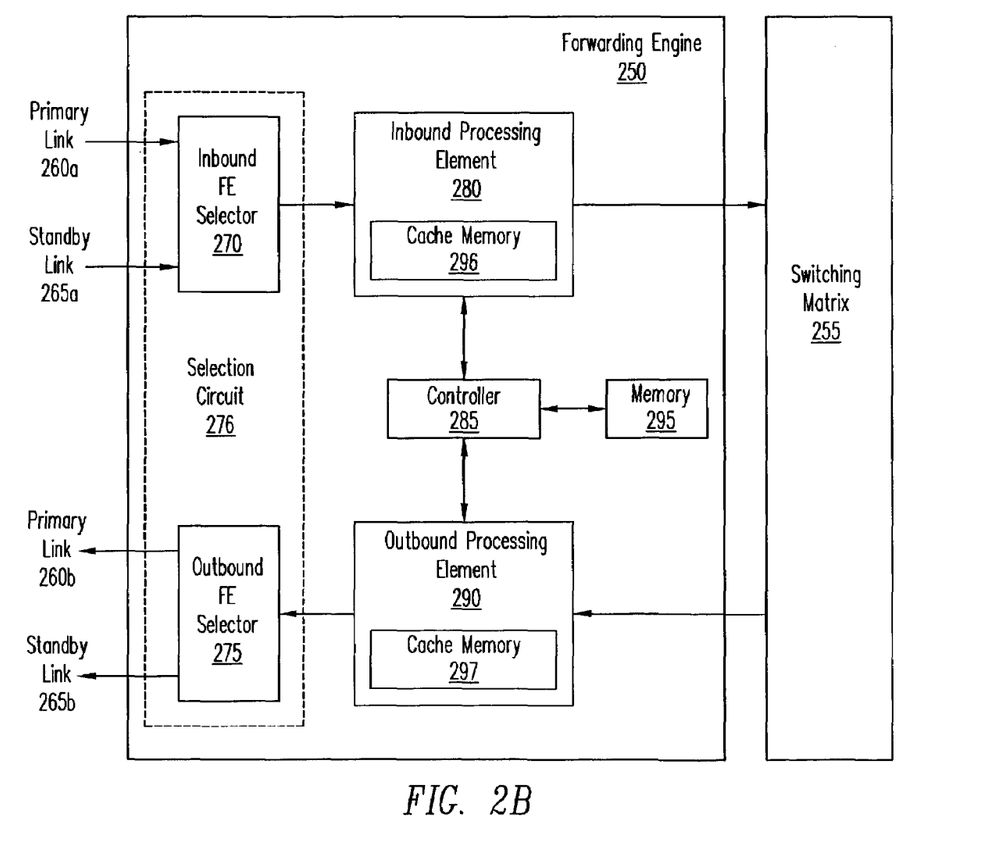
FIG. 2B is a block diagram illustrating a forwarding engine according to embodiments of the present invention.

FIG. 2B is a block diagram illustrating an example of a forwarding engine (depicted as a forwarding engine 250). Forwarding engine 250 is representative of one of forwarding engines 120(1)–(N+1) of FIG. 1. Forwarding engine 250 controls the forwarding of the information carried by a data stream received by a port card coupled to forwarding engine 250 as that information is passed to a switching matrix 255. As will be apparent, switching matrix 255 is exemplary of switching matrix 140. Forwarding engine 250 receives such data streams as a primary forwarding engine via a primary link 260a and transmits data streams as a primary forwarding engine via a primary link 260b. Similarly, forwarding engine 250 receives data streams as a standby forwarding engine via a standby link 265a and transmits data streams as a standby forwarding engine via a standby link 265b. The receiving and transmitting portions of the primary and standby links are depicted in FIG. 2B as such to allow for the description of the architecture of forwarding engine 250 in greater detail. Selection between primary links 260a and 260b, and standby links 265a and 265b is performed by an inbound FE selector 270 and an outbound FE selector 275, respectively (collectively referred to as a selection unit 276). Inbound FE selector 270 provides the data stream from the selected link to an inbound processing element 280. Inbound processing element 280 then forwards this data stream to switching matrix 255 under the control of a forwarding controller 285.

Conversely, a data stream received from switching matrix 255 is processed by an outbound processing element 290. Outbound processing element 290, under the control of forwarding controller 285, passes this data stream to outbound FE selector 275, which, in turn, passes the data stream back to the intended port card over either primary link 260b or standby link 265b. While forwarding controller 285 includes a certain amount of memory (e.g., on-chip or cache memory) additional memory is often required (e.g., for the storage of additional configuration information). This additional memory is depicted in FIG. 2B as a main memory (or more simply, memory) 295, which is coupled to forwarding controller 285 and may be, for example, DRAM memory. Storage of configuration information may also be provided in inbound processing element 280 and outbound processing element 290, as depicted in FIG. 2B by a cache memory 296 and a cache memory 297, respectively.

Storage of configuration information (e.g., forwarding entries for each source/destination pair that are used to forward packets to their intended destination) is critical to the operation of such network elements. Configuration information use by an FE when the FE is acting as a primary FE is referred to herein as primary configuration information, while configuration information use by an FE when the FE is acting as a standby FE is referred to herein as standby configuration information. Thus, ready access to such information is, by implication, critical to its proper operation. This access is fostered by storing the requisite information in the fastest memory that is economically feasible. If such configuration information is not readily accessible, the result can be lost packets, and so, a failure in the effort to provide users with a high-availability network element.

There being a number of locations at which FE configuration information can be stored, design tradeoffs must be addressed. The decision regarding where this information is stored is affected by a number of factors. Such factors include the time involved in accessing and storing the information, the effect that such a delay has on the seamless operation of the switch in the event of a failure, the size and cost of memory space at each possible location (typically, the farther away from the datapath the memory is located, the larger and less expensive the memory), integrated circuit (IC) area available for use as cache memory, and other such considerations. For example, if the configuration information (both primary and standby FE configurations) can be stored in cache memories 296 and 297 (faster, but typically smaller and more expensive), that will be preferable to storing that information in memory 295 (slower, but larger and less expensive). Such information can also be downloaded from the switch's route processor. This tradeoff will impact the manner in which the configuration information is stored and retrieved, thus affecting the manner in which FEs take over for one another.

Thus, if the information for both primary and standby FEs (primary and standby configuration information, respectively) can all be stored in cache memories 296 and 297, switchover will be relatively fast, though the solution will likely be more expensive (both in terms of cost and areal requirements within the IC(s)). Conversely, if the information for both primary and standby FEs is stored in memory 295, switchover can be relatively slow, though the solution will likely be less expensive. If cache memories 296 and 297 are not large enough to hold all the necessary information (i.e., can only store one set of configuration information (e.g., primary configuration information)), this may oblige the designer to construct the switch so that, in the event of a failure, standby configuration information is copied from the forwarding controller's memory, or even from one FE to another (in the manner previously described).

It should also be noted that the designer may choose to strike a balance between speed and efficient use of resources by designing cache memories 296 and 297 to be of a size just large enough to allow them to store the configuration for only one set of configuration information (e.g., the primary FE configuration). The standby FE configuration is then stored in memory 295. This has the benefits of minimizing cost (by keeping expensive on-chip cache memory to a minimum) and using IC area efficiently, while minimizing control message traffic by storing the standby information locally (as well as improving the speed with which such information can be made available, as a result of the comparatively high-speed transfer available between memory 295, and cache memories 296 and 297).

In addressing the more general case of an N:M redundancy scheme, the more possible standby FEs, the more configurations must be stored, thereby requiring increased memory space. This, in turn, makes the option of storing such information in cache less practical (or even impossible), and likely more expensive. Such considerations militate towards the use of the simpler (and less expensive) N+1 redundancy scheme, as less memory is required because only the information required to support the two FEs need be stored. The demand for memory space can be reduced further, however, if there is significant duplication in the two configurations, as noted below.

The information thus stored/copied may not need to be the full complement of configuration information, but only the information that differs from one FE to another. This can make possible the storage of such information closer to the datapath (e.g., in cache memories 296 and 297, or at least in memory 295). This technique may be particularly attractive in the case where L>1 (or L>>1), in which the reduction in memory requirements can make possible an otherwise unfeasible arrangement.

One optimization recognizes that the $(N+1)^{th}$ FE (also referred to herein as the standby FE) need only be loaded with the configuration information for the $N^{th}$ FE, and the first FE only loaded with the configuration information for that FE, if the architecture depicted in FIG. 1 is used. This is because these two FEs are only ever used in the one capacity (standby and primary FE, respective). Thus, only the other affected FEs need copy their information from one to another (assuming the cascading technique is used).

Figure 3:
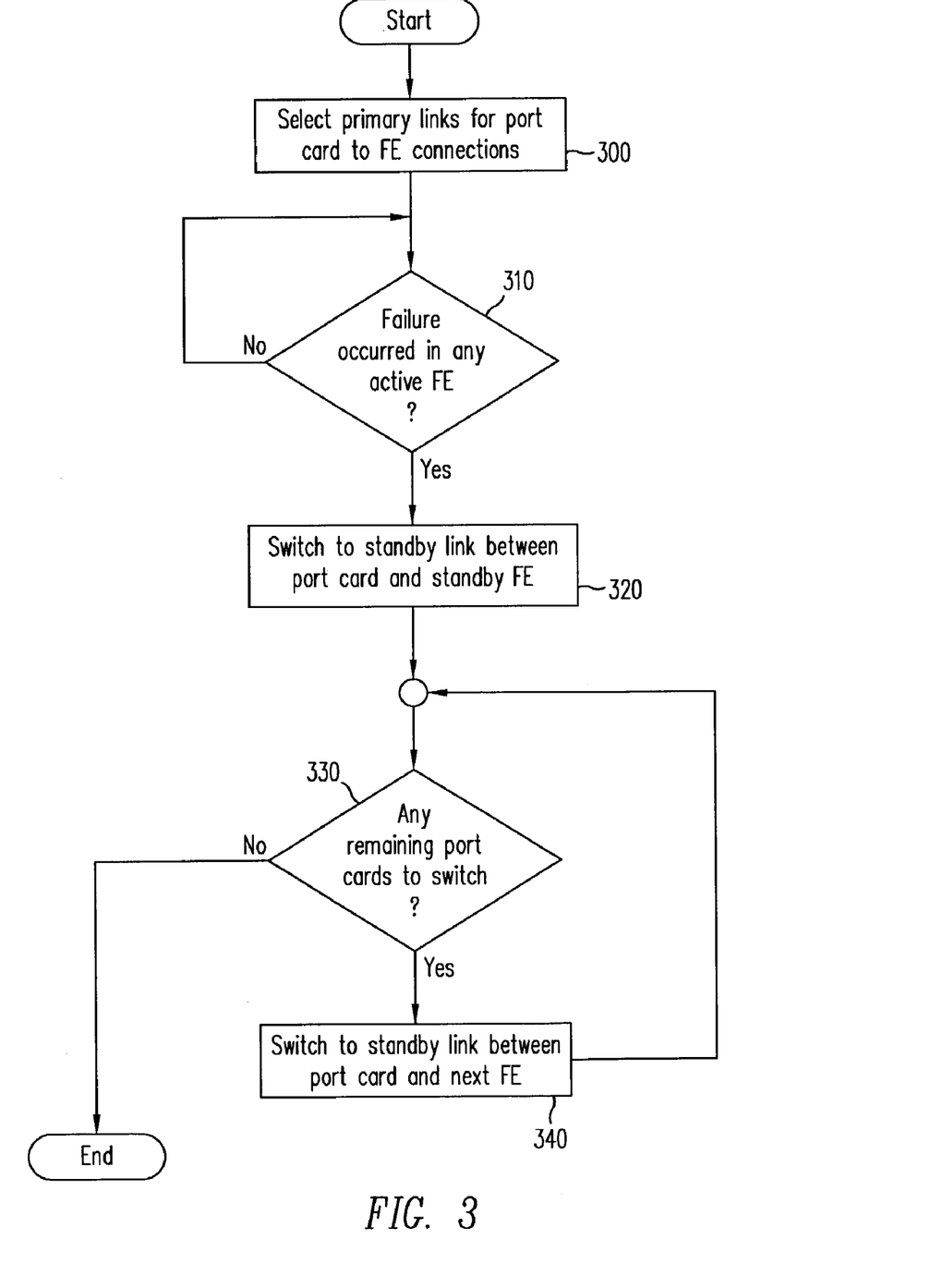
FIG. 3 is a flow diagram illustrating actions performed by a process according to an embodiment of the present invention.

FIG. 3 is a flow diagram illustrating the actions performed by a process according to an embodiment of the present invention. The process begins with the selection of primary links by the port cards and forwarding engines to provide connectivity between these elements (step 300). Once the primary links have been selected, the switch's route processor awaits the indication of a failure in one of the active forwarding engines (step 310). While no such failures occur, the process simply loops. In the event of such a failure, one or more of the standby links are selected by the affected port cards and forwarding engines. This switching can be effected in any one of a number of ways. For example, switching for all such affected links can be performed simultaneously under the control of the switch's route processor. Alternatively, a cascading technique can be used, as is depicted in FIG. 3. In such a process, the route processor causes the port card attached to the failed forwarding engine to switch over to its standby link, and the port card's standby forwarding engine to also switch to the standby link to support that port card (step 320).

The route processor then makes a determination as to whether any other port cards (e.g., a port card attached to another port card's standby forwarding engine that now must be supported) still need to be switched over to their standby link (and, thus, their standby forwarding engine) (step 330). If additional port cards remained to be switched, the next such port card is switched over to its standby link, and its corresponding standby forwarding engine also switched to that standby link (step 340). In this manner, switching over from primary link and primary forwarding engine to standby link and standby forwarding engine ripples from the failed forwarding engine across to the last standby forwarding engine (e.g., forwarding engine 120(N+1) of FIG. 1). Configuration information is thus copied from one forwarding engine to another, in a daisy-chain fashion. Once all such switches have been made, the process completes. At this point, the failed forwarding engine, having been switched out of service, can now be replaced.

An alternative to this cascading technique is for the route processor to simply configure all affected port cards and forwarding engines to switch over to their corresponding standby forwarding engines/port cards, respectively, at (approximately) the same time. In this manner, the forwarding engines are configured to support the port card for which those forwarding engines are a standby, and so, preferably, store their standby configuration information in some readily accessible location, for quick availability in the event of a failure. However, this means that each forwarding engine should support the storage of such configuration information (both the primary and standby connections), so that the switchover can be accomplished without the delay involved in copying configuration information from one forwarding engine to another.

As noted, FIG. 3 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media. optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 4A:
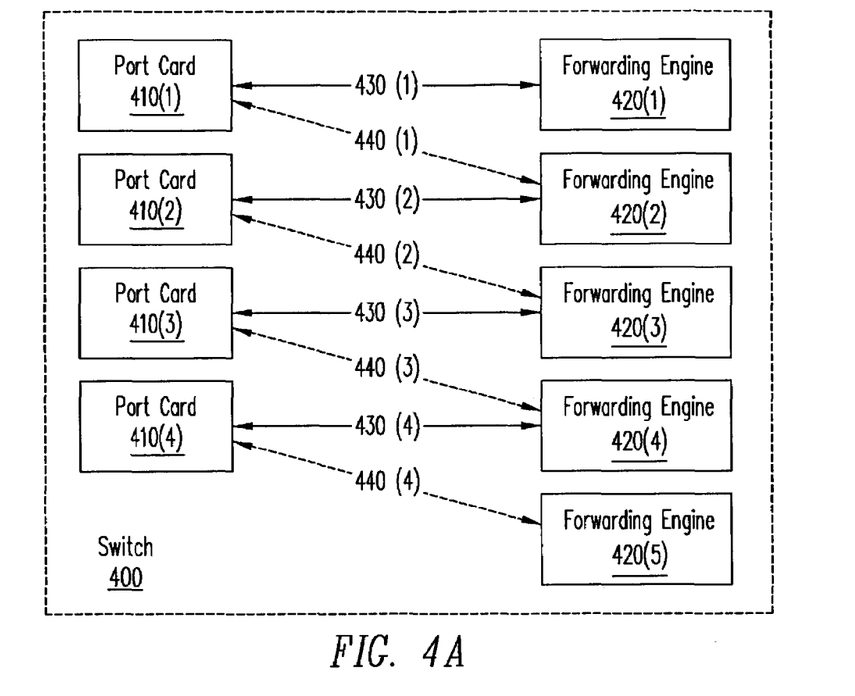
FIGS. 4A and 4B are block diagrams illustrating the operation of an architecture according to embodiments of the present invention.
Figure 4B:
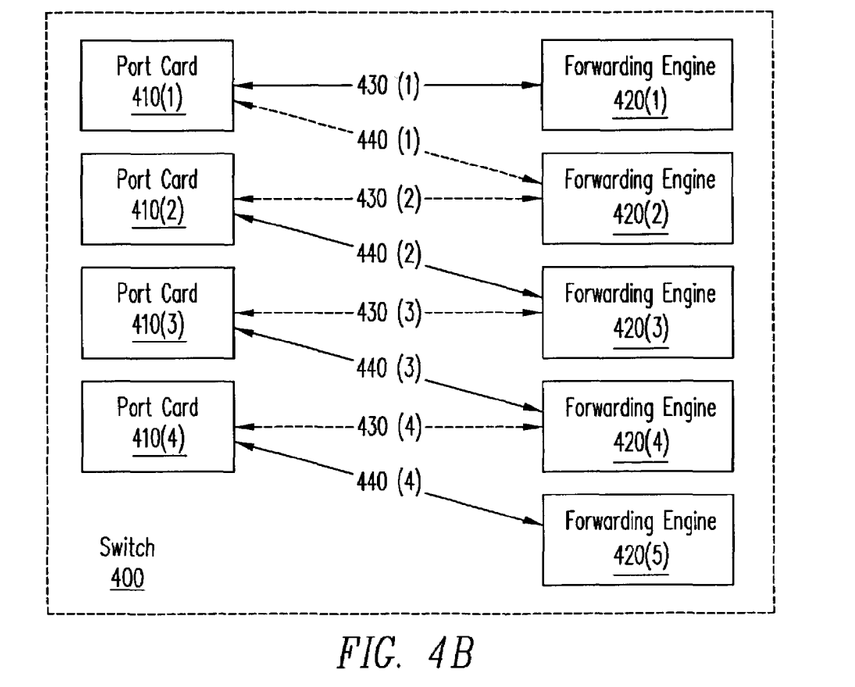

FIGS. 4A and 4B illustrate the operation of an architecture according to embodiments of the present invention, in the case where a forwarding engine fails and standby links and standby forwarding engines are called into service. FIG. 4A is a block diagram depicting a switch 400 configured for normal operation, in that none of its forwarding engines have failed. Switch 400 includes a number of port cards (depicted as port cards 410(1)–(4)) and forwarding engines (depicted as forwarding engines 420(1)–(5)). It will be noted that forwarding engine 420(5) is also referred to herein as a standby forwarding engine, indicating that, while switch 400 is configured to use its primary forwarding engines, that the standby forwarding engine's purpose is to be available should one of the primary forwarding engines fail.

As depicted in FIG. 4A, port cards 410(1)–(4) are coupled to their primary forwarding engines (forwarding engines 420(1)–(4)) by primary links 430(1)–(4). As will be noted in FIG. 4A, the standby links 440(1)–(4) provide connectivity between port cards 410(1)–(4) and forwarding engines 420(2)–(5), respectively (in addition to primary links 430(1)–(4), with regard to forwarding engines 420(2)–(4)). In the case where one of forwarding engines 420(1)–(4) fails, one or more of standby links 440(1)–(4) is brought into service to provide connectivity between the affected ones of port cards 410(1)–(4) and forwarding engines 420(2)–(5), as discussed in greater detail below.

FIG. 4B is a block diagram illustrating the situation in which a forwarding engine fails (forwarding engine 420(2), for example). In such case, port card 410(1) remains coupled to forwarding engine 420(1) via primary link 430(1), and does not make use of standby link 440(1). Port card 410(2), however, having been coupled to the now-failed forwarding engine 420(2) via primary link 430(2), must now be coupled to its standby forwarding engine (forwarding engine 420(3)) using standby link 440(2). This change in connectivity is effected by port card 410(2) and forwarding engine (420(3) selecting standby link 440(2). As a result, and in the manner of cascading discussed in connection with FIG. 3, port card 410(3) now switches from forwarding engine 420(3) to forwarding engine 420(4). This change in connectivity is made by switching from primary link 430(3) to standby link 440(3), through the selection of standby link 440(3) by port card 410(3) and forwarding engine 420(4). In a similar fashion, port card 410(4) is forced to switch from forwarding engine 420(4) to forwarding engine 420(5), by the selection of standby link 440(4) and the de-selection of primary link 430(4). This change in connectivity thus couples port card 410(4) to forwarding engine 420(5) (i.e., the standby forwarding engine).

Alternatively, as noted, port cards 410(1)–(4) and forwarding engines 420(1)–(5) can be configured to switch simultaneously. Using this approach, forwarding engines 420(2)–(4) each maintain primary and standby configurations. As will be apparent, forwarding engines 420(1) and 420(5) need only maintain their primary and standby configurations, respectively. In the event of a failure (e.g., of forwarding engine 420(2)), forwarding engines 420(3)–(4) simply alter the port card to which they are coupled and begin using their respective standby configuration information, while forwarding engine 420(1) continues as before and forwarding engine 420(5) is pressed into service.

Depending on the implementation, these transitions may result in two port cards being coupled to the same FE for a short period of time. If this can occur, the FEs must be designed to accept data streams from multiple port cards, and to correctly forward this information. As will be evident, the FEs in such a system must also be designed to be coupled to multiple links at the same time. Conversely, the port cards of such a system must be able to receive data streams through both their primary and standby links. Such capabilities ensure that data is not lost during such transitions.

The process is similar, although not identical, in the case where not all port cards and FEs are installed in the given switch. For example, while switch 100 is shown generically in FIG. 1 as being fully populated, such may not always be the case. If switch 100 is not fully populated with port cards and FEs, the N PPsets are preferably populated in (logically) adjacent slots which are coupled to N+1 FE slots. The N+1 FEs are then installed in the slots corresponding to those to which the port cards are coupled. For example, consider a switch capable of carrying 7 port cards and 8 FEs. However, only 4 port cards (referred to here as PC1 thru PC4) and 5 FEs (referred to here as FE1 thru FE5) are populated. Connections can be configured as follows:

PC1 to FE1 and FE2
PC2 to FE2 and FE3
PC3 to FE3 and FE4

PC4 to FE4 and FE5
PC5 (unpopulated) to FE5 and FE6 (unpopulated)
PC6 (unpopulated) to FE6 (unpopulated) and FE7 (unpopulated)
PC7 (unpopulated) to FE7 (unpopulated) and FE1

A failure in such a scenario is handled in a manner similar to a fully-populated switch. For example, consider initially that all primary FEs are in working order and FE1 thru FE4 are servicing PC1 thru PC4, respectively. Subsequently, FE2 fails. In that case, the switch is reconfigured so that FE5 services PC4, FE4 services PC3 and FE3 services PC2. FE2 is taken out of commission for servicing. It should be noted that the FEs may need to be reprogrammed to service a different port card. There are various mechanisms of accomplishing this reprogramming. At its simplest, the reprogramming can be done sequentially in the above example, cascading the reconfiguration of FE5, FE4 & then FE3 in sequence. Alternatively, if the memory for the tables maintained by the FEs is large enough, each FE can be preconfigured to handle two port cards (e.g., FE4 in the above example will be preprogrammed to handle PC3 and PC4). In that case, the FEs do not require reprogramming in the event of a failure.

It should be noted that, whatever the method for providing programming to an FE when implementing an embodiment of the present invention, the switchover to the standby FE should be stateful (i.e., maintain information regarding the state of the failed FE so as to allow the data streams switched thereby to proceed as if no failure had occurred). As noted, this can be done by pre-programming all the necessary information into each FE, by copying information from one FE to another, or by some other method (e.g., by downloading such information from the switch's route processor). This is an important feature, because it supports such a switch's ability to maintain the data streams being switched in the face of an FE failure.

It should be further noted that such techniques need not be used exclusively. Depending on the situation, a combination of simultaneous switchover and cascading switchover can be used. For example, the FEs closer to the failure may switchover using the cascading technique, and those farther away from the failed FE can use the simultaneous technique (having been given time to prepare for the transition by the time required for the minimal cascading transition performed). Alternatively, groups of FEs can be configured to switchover simultaneously.

Examples of Alternative Network Element Architectures

Figure 5:
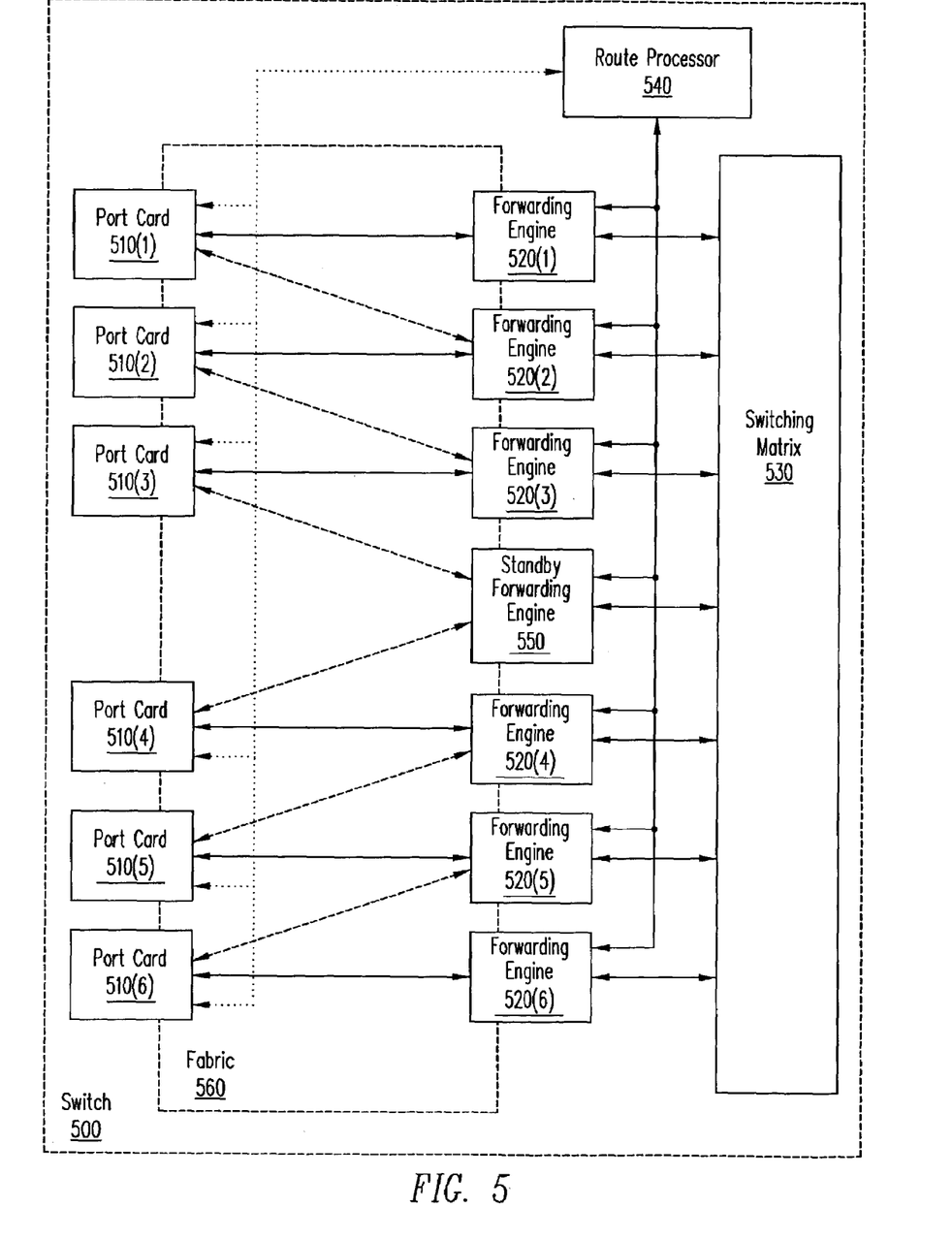
FIG. 5 is a block diagram illustrating an alternative embodiment of a switch according to embodiments of the present invention.

FIG. 5 is a block diagram illustrating an alternative embodiment of a switch 500 that can be used to reduce the average latency time required to switch to one or more standby forwarding engines in the case of a failure of a primary forwarding engine. Switch 500, as before, includes a number of port cards (depicted as port cards 510(1)–(6)) which are coupled to a number of forwarding engines (depicted as forwarding engines 520(1)–(6)). Forwarding engines 520(1)–(6) each act as the primary forwarding engines for a respective one of port cards 510(1)–(6). Forwarding engines 520(1)–(6) forward data streams from port cards 510(1)–(6) to a switching matrix 530 under the control of a route processor 540, in the manner of that depicted in FIG. 1. Also included in switch 500 is a standby forwarding engine 550. Standby forwarding engine 550, while structurally no different from forwarding engines 520(1)–(6), is coupled to two port cards (i.e., port cards 510(3) and 510(4)) as a standby forwarding engine, and so is able to act as a standby forwarding engine for either of these port cards by selecting the appropriate standby link. In the architecture depicted in FIG. 5, the structures responsible for selecting primary and standby links/forwarding engines (including the primary and standby links) are referred to in the aggregate as a distributed switching fabric 560. By allowing port cards 510(1)–(6) to select respective ones of forwarding engines 520(2)–(5), in addition to standby forwarding engine 550, as standby forwarding engines, the architecture of switch 500 allows such selections to cascade through the architecture in half the time required by the architecture depicted in FIG. 1, on average.

It should also be noted that another alternative using the basic architecture of switch 100 of FIG. 1 is to extend that architecture in a manner similar to that of switch 500 of FIG. 5. That is, in addition to coupling port card 110(N) to forwarding engine 120(N+1), port card 110(1) can also be coupled to forwarding engine 120(N+1), using the second input of the inbound and outbound selectors of forwarding engine 120(N+1). Thus, by allowing the cascading away from a failed forwarding engine to proceed in either direction, forwarding engine 120(N+1) is effectively positioned in the "middle" of forwarding engines 120(1)–(N). In such a configuration, a given port card can be made to switch over to its standby forwarding engine (e.g., when switching in the "down" direction, in FIG. 1) or to a "tertiary" forwarding engine (e.g., when switching in the "up" direction (that being the opposite of the "down" direction just described)). As with switch 500, because the farthest away a failed forwarding engine can be from the standby forwarding engine (e.g., forwarding engine 120(N+1)), the distance is reduced from a maximum of N to a maximum of N/2, and so the average latency time is likewise halved.

Alternatively, a round-robin approach may be employed. The standby forwarding engine (e.g., forwarding engine 120(N+1) of FIG. 1) can be coupled to both the first and last port cards (e.g., port card 110(N), as shown, and port card 110(1), respectively). In that case, each of port cards 110(1)–(N) are coupled to three (3) forwarding engines, a primary forwarding engine, a standby forwarding engine in the "clockwise" direction, and a standby forwarding engine in the "counter-clockwise" direction. Thus, depending on the location of the failure, the switchover can proceed away from the failure and towards the standby forwarding engine along the shortest route (i.e., the direction that involves switching over the fewest number of forwarding engines (in order to arrive at the standby forwarding engine)). The extra circuitry involved could be a concern, but would be minimal–mux/demux circuits would be 3-way (instead of 2-way), and additional links would have to be provided in the opposite direction (e.g., from port card 110(K) to forwarding engine 120(K–1)).

Figure 6:
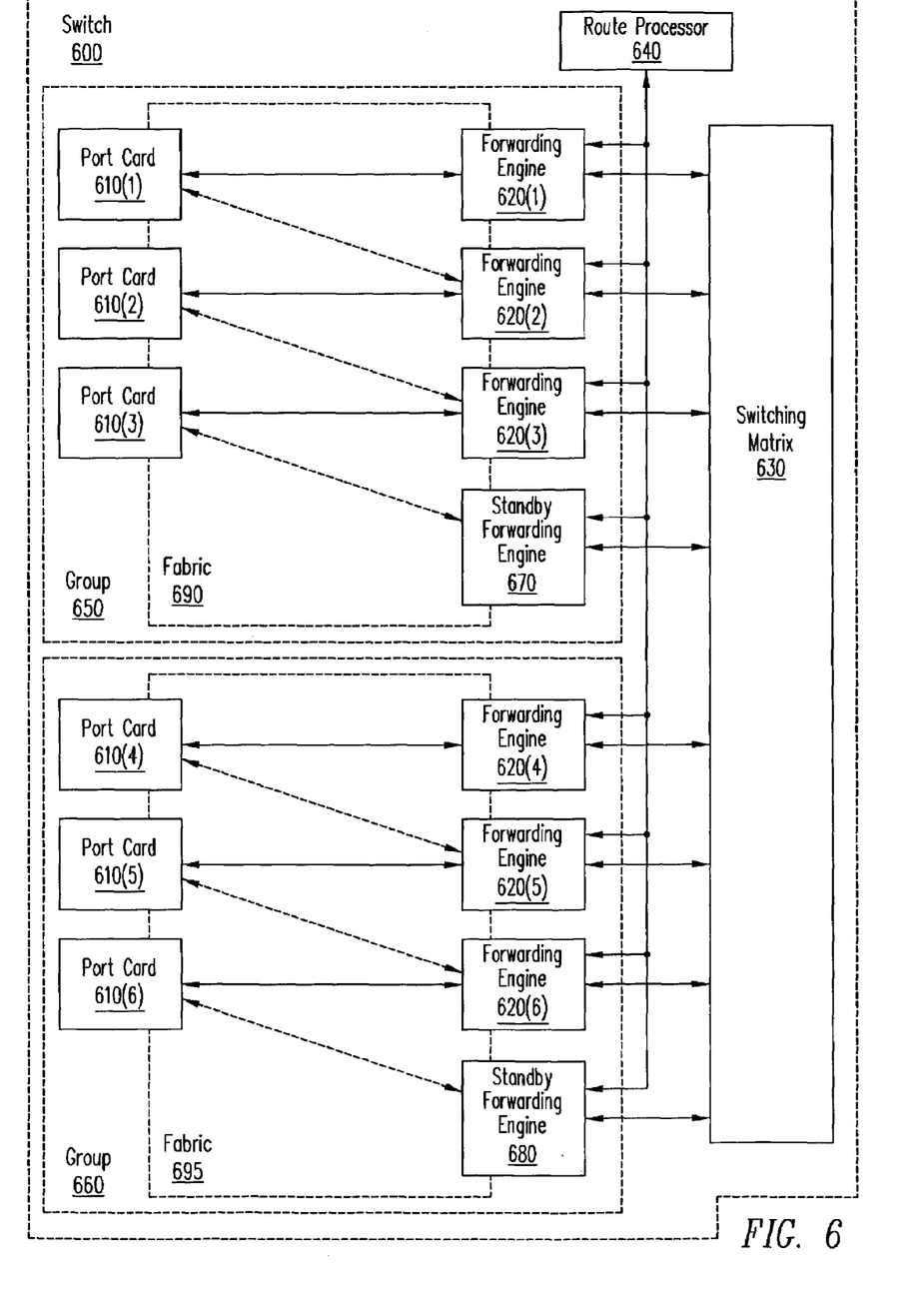
FIG. 6 is a block diagram of a switch illustrating yet another alternative architecture that can be used to improve performance of embodiments of the present invention.

FIG. 6 is a block diagram of a switch 600 illustrating yet another alternative architecture that can be used to improve performance of embodiments of the present invention. Switch 600 includes a number of port cards (depicted as port cards 610(1)–(6)) coupled to a number of forwarding engines (depicted as forwarding engines 620(1)–(6)). Forwarding engines 620(1)–(6) are coupled to port cards 610(1)–(6) as primary forwarding engines via primary links 625(1)–(6). Forwarding engines 620(1)–(6) forward data streams from port cards 610(1)–(6) to a switching matrix 630 under the control of a route processor 640, in the manner of the architecture as depicted in FIGS. 1 and 5. In contrast to the architecture of switch 100, switch 600 groups port cards and forwarding engines to improve the latency associated with the switchover in the case of a forwarding engine failure. This grouping is effected by providing a standby forwarding engine that is dedicated to supporting its designated group. Thus, as depicted in FIG. 6, port cards 610(1)–(3) and forwarding engines 620(1)–(3) are grouped together in a group 650, while port cards 610(4)–(6) and forwarding engine 620(4)–(6) are grouped into a group 660.

As noted, supporting each of these groups is a standby forwarding engine. A standby forwarding engine 670 supports the port cards and forwarding engines of group 650, while a standby forwarding engine 680 supports the port cards and forwarding engines of group 660. When a failure occurs in one of forwarding engines 620(1)–(3) (of group 650) appropriate ones of standby links 685(1)–(3) are selected by appropriate ones of port cards 610(1)–(3), forwarding engines 620(2)–(3), and standby forwarding engine 670. In this manner, a failure in one of forwarding engine 620(1)–(3) is dealt with by switching to standby forwarding engines (in the manner of switch 100 of FIG. 1). Similarly, appropriate ones of port cards 610(4)–(6) select coupling to appropriate ones of forwarding engines 620(5)–(6) and standby forwarding engine 680 via the appropriate ones of standby lengths 685(4)–(6). As before, structures within port cards 610(1)–(3), forwarding engines 620(2)–(3), and standby forwarding engine 670 form a distributed switching fabric 690, while corresponding structures in port cards 610(4)–(6), forwarding engines 620(5)–(6), and standby forwarding engines 680 form a distributed switching fabric 695. It should be noted that distributed switching fabric 690 does not, however, provide any-to-any connectivity, but only the connectivity supported by the muxes/demuxes of the port cards and FEs. In simple terms, latency times are reduced and mean-time between failure is improved by the addition of standby forwarding engines, which in turn allow the division of port cards and forwarding engines into groups. Each of these groups operates in a manner similar to that of the architecture of switch 100 in FIG. 1, albeit with fewer port cards and forwarding engines, and so fewer switchovers to perform in any given situation.

In fact, any of the other approaches according to the present invention can employ this grouping concept (or, conversely, once grouped, each group can employ one of the other approaches (and need not even employ the same ones)). Thus, within a group, a cascading approach, a round-robin approach or other approach may be used. The tradeoff here is the localization of a failure's effects for increased complexity and number of standby forwarding engines.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A network element comprising:
   N interface units, wherein a value of N is an integer greater than 1;
   a plurality of links; and
   M processing units, wherein
      each of said interface units is directly coupled to L+1 of said processing units,
      a value of L is an integer greater than 0 and less than N,
      a value of M equals N plus L,
      each of said links is configured to directly couple a one of said interface units and a one of said processing units,
      each of said interface units is configured to select a one of a plurality of said links that directly couple said each of said interface units and ones of said processing units to one another, and
      said plurality of said links comprises a primary link and a standby link.
2. The network element of claim 1, wherein:
   each of said processing units is configured to select a one of a plurality of said links that couple ones of said interface units and said each of said processing units to one another.
3. The network element of claim 2, wherein
   said each one of said interface units is coupled to a primary one of said processing units and a standby one of said processing units, and
   said each one of said interface units is configured to switch over from said primary one of said processing units to said standby one of said processing units, in the event of a failure of a one of said processing units.
4. The network element of claim 3, wherein
   said each one of said processing units is coupled to a first one and a second one of said interface units, and
   said each one of said processing units is configured to switch over from said first one of said interface units to said second one of said interface units in the event of said failure.
5. The network element of claim 2, wherein
   said each of said interface units is coupled to a primary one of said processing units by one of a plurality of primary links of said links.
6. The network element of claim 5, wherein
   said each of said interface units is coupled to a standby one of said processing units by one of a plurality of standby links of said links.
7. The network element of claim 2, wherein
   said each of said interface units is configured to select by virtue of comprising a selector, and
   said each of said interface units is coupled to one of a one of said processing units by one of a plurality of primary links of said links and another one of said processing units by one of a plurality of standby links of said links by said selector.
8. The network element of claim 7, wherein
   said each of said processing units is configured to select by virtue of comprising a selection unit, and
   said each of said processing units is coupled to one of a one of said interface units by one of said primary links and another one of said interface units by one of said standby links by said selection unit.
9. The network element of claim 2, wherein
   said interface units and said processing units comprise a group, and
   said group is one of a plurality of such groups.
10. The network element of claim 9, further comprising:
    a switching matrix, wherein
       each of said groups is communicatively coupled to said switching matrix.
11. The network element of claim 2, wherein L equals 1.
12. The network element of claim 11, wherein
    said each one of said interface units is coupled to a primary one of said processing units and a standby one of said processing units.
13. The network element of claim 12, wherein
    a value of I is an integer greater than 0, and said primary one of said processing units is an I$^{th}$ one of said processing units and said standby one of said processing units is an (I+1)$^{th}$ one of said processing units.

14. The network element of claim 13, wherein
said each one of said interface units is further coupled to a tertiary one of said processing units,
said primary one of said processing units is an I$^{th}$ one of said processing units, said standby one of said processing units is an (I+1)$^{th}$ one of said processing units, and said tertiary one of said processing units is an (I−1)$^{th}$ one of said processing units, and
said tertiary one of said processing units is an (N+1)$^{th}$ one of said processing units if I equals 1.

15. The network element of claim 12, wherein
said value of N is an even integer greater than 1.
a value of I is an integer greater than 0,
for a first one of said processing units through an (N/2)$^{th}$ one of said processing units, said primary one of said processing units is an I$^{th}$ one of said processing units and said standby one of said processing units is an (I+1)$^{th}$ one of said processing units, and
for a ((N/2)+2)$^{th}$ one of said processing units through an (N+1)$^{th}$ one of said processing units, said primary one of said processing units is an I$^{th}$ one of said processing units and said standby one of said processing units is an (I−1)$^{th}$ one of said processing units.

16. The network element of claim 11, wherein
said each one of said processing units is coupled to a first one and a second one of said interface units.

17. The network element of claim 16, wherein, in the event of a failure of a one of said processing units,
said each one of said interface units is configured to switch over from said primary one of said processing units to said standby one of said processing units, and
said each one of said processing units is configured to switch over from said first one of said interface units to said second one of said interface units in the event of said failure.

18. The network element of claim 2, further comprising:
a distributed switching fabric, wherein
said each of said interface units is configured to select by virtue of comprising a selector,
said each of said processing units is configured to select by virtue of comprising a selection unit, and
said distributed fabric comprises said selectors, said selection units and said links.

19. The network element of claim 18, wherein
said each of said interface units is coupled to one of a one of said processing units by one of a plurality of primary links of said links and another one of said processing units by one of a plurality of standby links of said links by said selector, and
said each of said processing units is coupled to one of a one of said processing units by one of said primary links and another one of said processing units by one of said standby links by said selection unit.

20. A method of failure recovery in a network element comprising:
selecting a first link, said first link coupling a first interface unit and a first processing unit;
selecting a second link, said second link coupling a second interface unit and a second processing unit; and
upon a failure in said first processing unit,
 selecting a first standby link, said first standby link coupling said first interface unit and said second processing unit, and
 selecting a second standby link, said second standby link coupling said second interface unit and a standby processing unit.

21. The method of claim 20, wherein
said first standby link is selected first and said second standby link is selected second, in a cascading fashion.

22. The method of claim 20, further comprising:
downloading standby configuration information from a route processor to said second processing unit.

23. The method of claim 20, further comprising:
maintaining primary configuration information and standby configuration information in a cache memory of said second processing unit.

24. The method of claim 20, further comprising:
maintaining primary configuration information in a cache memory of said second processing unit; and
transferring standby configuration information from a main memory of said second processing unit to said cache memory, upon said failure.

25. The method of claim 20, further comprising:
transferring standby configuration information from said second processing unit to said standby processing unit, upon said failure.

26. The method of claim 20, further comprising:
selecting a third link, said third link coupling a third interface unit and a third processing unit;
selecting a fourth link, said fourth link coupling a fourth interface unit and a fourth processing unit; and
upon a failure in said fourth processing unit,
 selecting a third standby link, said third standby link coupling said third interface unit and said standby processing unit, and
 selecting a fourth standby link, said fourth standby link coupling said fourth interface unit and said third processing unit.

27. The method of claim 26, wherein
said third standby link is selected first and said fourth standby link is selected second, in a cascading fashion.

28. A network element comprising:
a first and a second interface unit;
a first and a second link;
a first and a second standby link;
a first, a second and a standby processing unit, wherein
 said first interface unit and said first processing unit are coupled to one another by said first link,
 said second interface unit and said second processing unit are coupled to one another by said second link,
 said first interface unit and said second processing unit are coupled to one another by said first standby link, and
 said second interface unit and said standby processing unit are coupled to one another by said second standby link;
a route processor, coupled to control said first and said second interface units, and said first, said second and said standby processing units;
computer readable medium, wherein said computer readable medium is coupled to at least one of said route processor, said first processing unit, said second processing unit and said standby processing unit; and
computer code, encoded in said computer readable medium, configured to:
 select said first link;
 select said second link; and
 to, upon a failure in said first processing unit,
  select said first standby link, and
  select said second standby link.

29. The network element of claim 28, wherein
said first standby link is selected first and said second standby link is selected second, in a cascading fashion.

30. The network element of claim 28, wherein said computer code is further configured to:
download standby configuration information from said route processor to said second processing unit.

31. The network element of claim 28, wherein said computer code is further configured to:
maintain primary configuration information and standby configuration information in a cache memory of said second processing unit.

32. The network element of claim 28, wherein said computer code is further configured to:
maintain primary configuration information in a cache memory of said second processing unit; and
transfer standby configuration information from a main memory of said second processing unit to said cache memory, upon said failure.

33. The network element of claim 28, wherein said computer code is further configured to:
transfer standby configuration information from said second processing unit to said standby processing unit, upon said failure.

34. The network element of claim 28, wherein:
said network element further comprises
a third and a fourth interface unit,
a third and a fourth link,
a third and a fourth standby link, and
a third and a fourth processing unit;
said third interface unit and said third processing unit are coupled to one another by said third link;
said fourth interface unit and said fourth processing unit are coupled to one another by said fourth link;
said third interface unit and said standby processing unit are coupled to one another by said third standby link;
said fourth interface unit and said third processing unit are coupled to one another by said fourth standby link; and
said computer code is further configured to
select a said third link,
select said fourth link, and
to, upon a failure in said fourth processing unit,
select said third standby link, and
select said fourth standby link.

35. The network element of claim 34, wherein
said third standby link is selected first and said fourth standby link is selected second, in a cascading fashion.

36. A computer program product comprising:
a first set of instructions, executable on a computer system, configured to select a first link, said first link coupling a first interface unit and a first processing unit;
a second set of instructions, executable on said computer system, configured to select a second link, said second link coupling a second interface unit and a second processing unit;
a third set of instructions, executable on said computer system, configured to, upon a failure in said first processing unit,
select a first standby link, said first standby link coupling said first interface unit and said second processing unit, and
select a second standby link, said second standby link coupling said second interface unit and a standby processing unit; and
computer readable media, wherein said computer program product is encoded in said computer readable media.

37. The computer program product of claim 36, wherein
said first standby link is selected first and said second standby link is selected second, in a cascading fashion.

38. The computer program product of claim 36, further comprising:
a fourth set of instructions, executable on said computer system, configured to download standby configuration information from a route processor to said second processing unit.

39. The computer program product of claim 36, further comprising:
a fourth set of instructions, executable on said computer system, configured to maintain primary configuration information and standby configuration information in a cache memory of said second processing unit.

40. The computer program product of claim 36, further comprising:
a fourth set of instructions, executable on said computer system, configured to maintain primary configuration information in a cache memory of said second processing unit; and
a fifth set of instructions, executable on said computer system, configured to transfer standby configuration information from a main memory of said second processing unit to said cache memory, upon said failure.

41. The computer program product of claim 36, further comprising:
a fourth set of instructions, executable on said computer system, configured to transfer standby configuration information from said second processing unit to said standby processing unit, upon said failure.

42. The computer program product of claim 36, wherein said second set of instructions comprises:
a fourth set of instructions, executable on said computer system, configured to select a third link, said third link coupling a third interface unit and a third processing unit;
a fifth set of instructions, executable on said computer system, configured to select a fourth link, said fourth link coupling a fourth interface unit and a fourth processing unit; and
a sixth set of instructions, executable on said computer system, configured to, upon a failure in said fourth processing unit,
select a third standby link, said third standby link coupling said third interface unit and said standby processing unit, and
select a fourth standby link, said fourth standby link coupling said fourth interface unit and said third processing unit.

43. The computer program product of claim 42, wherein
said third standby link is selected first and said fourth standby link is selected second, in a cascading fashion.

44. An apparatus for failure recovery in a network element comprising:
means for selecting a first link, said first link coupling a first interface unit and a first processing unit;
means for selecting a second link, said second link coupling a second interface unit and a second processing unit;
means for selecting a first standby link, said first standby link coupling said first interface unit and said second processing unit, upon a failure in said first processing unit; and means for selecting a second standby link, said second standby link coupling said second interface unit and a standby processing unit, upon said failure.

45. The apparatus of claim 44, wherein
said first standby link is selected first and said second standby link is selected second, in a cascading fashion.

46. The apparatus of claim 44, further comprising:
means for downloading standby configuration information from a route processor to said second processing unit.

47. The apparatus of claim 44, further comprising:
means for maintaining primary configuration information and standby configuration information in a cache memory of said second processing unit.

48. The apparatus of claim 44, further comprising:
means for maintaining primary configuration information in a cache memory of said second processing unit; and
means for transferring standby configuration information from a main memory of said second processing unit to said cache memory, upon said failure.

49. The apparatus of claim 44, further comprising:
means for transferring standby configuration information from said second processing unit to said standby processing unit, upon said failure.

50. The apparatus of claim 44, further comprising:
means for selecting a third link, said third link coupling a third interface unit and a third processing unit;
means for selecting a fourth link, said fourth link coupling a fourth interface unit and a fourth processing unit; and
means for selecting a third standby link, said third standby link coupling said third interface unit and said standby processing unit, upon a failure in said fourth processing unit, and
means for selecting a fourth standby link, said fourth standby link coupling said fourth interface unit and said third processing unit, upon said failure.

51. The apparatus of claim 50, wherein
said third standby link is selected first and said fourth standby link is selected second, in a cascading fashion.

* * * * *